July 18, 1944.   G. A. TINNERMAN   2,353,796
LOCKING FASTENER
Original Filed Oct. 21, 1941
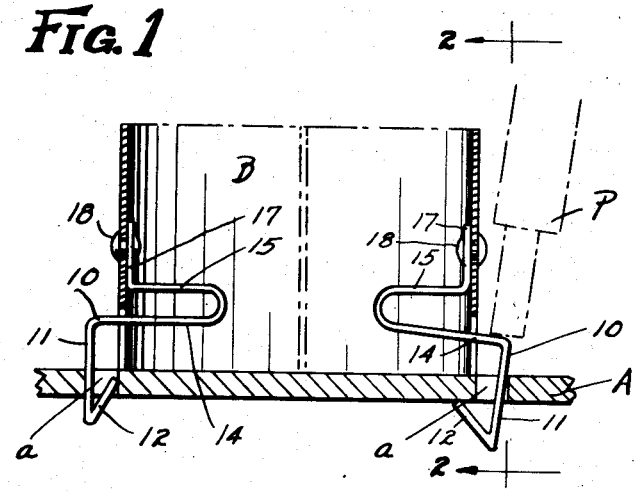
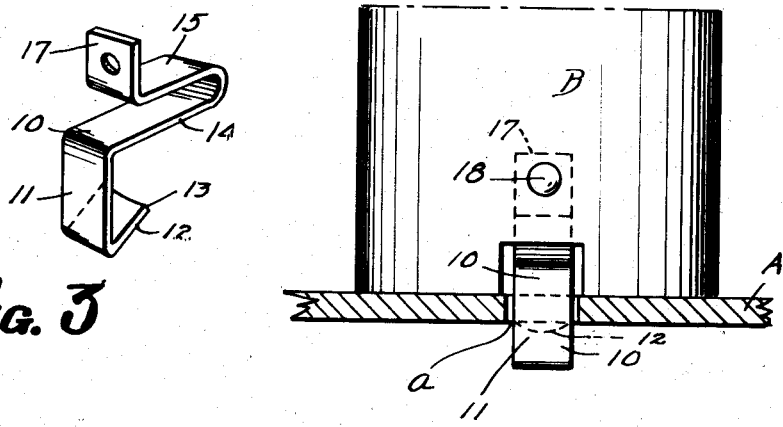
INVENTOR.
GEORGE A. TINNERMAN
BY
ATTORNEYS Patented July 18, 1944

2,353,796

UNITED STATES PATENT OFFICE 2,353,796

LOCKING FASTENER

George A. Tinnerman, Cleveland, Ohio, assignor to Tinnerman Products, Inc., Cleveland, Ohio, a corporation of Ohio Application October 21, 1941, Serial No. 415,969, which is a division of application Serial No. 366,472, November 20, 1940. Divided and this application November 13, 1943, Serial No. 510,191

5 Claims. (Cl. 85—5)

This invention relates in general to improvements in fastening installations wherein an object or part is secured to an apertured support by a spring clip fastener involving a novel principle for providing a positive locked securing action thereof in applied fastening position. The present application is a division of prior copending application Serial No. 415,969, filed October 21, 1941, as a division of Serial No. 366,472, filed November 20, 1940, now Patent No. 2,265,957, issued December 9, 1941.

More particularly, the invention is directed to a spring clip fastener which may be constructed in different forms for various applications and uses, but in any case, is adapted to provide a positive locked securing action in a work aperture and otherwise reliably fasten the parts of an assembly under continuously effective spring tension against loosening or displacement even under extreme conditions of shock, vibratory motion, and the like.

The present invention involves an arrangement for fastening a member to a support by means of a clip on the member which may pass through an opening in the support and retain spring engagement therewith, the parts being so arranged that the mere positioning of the article on the support does not of itself complete the fastening action, and thus enables very accurate positioning of the parts before fastening is effected. Then when the clip is diverted from its normal position, its reaction causes it to obtain a spring hold on the support in the manner to lock the parts fixedly and rigidly together.

A principal object of the invention, therefore, is to provide an improved fastening means of this character which may be provided for various types of installations and embodying a clip shank construction that is intended to be forcibly applied to positive locked engagement in a work aperture following the assembly of the parts of the installation in exact, predetermined relation, and further, to secure the parts in such relation under continuously effective spring tension against loosening, displacement or disassociation.

A further object of the invention is to provide a spring fastener construction of the kind described comprising a clip shank or securing portion adapted to be forcibly applied to an aperture in a support, as aforesaid, an attaching portion for attaching the fastener to an object or part to be secured to said support, and a resilient, yieldable connecting portion joining said securing and attaching portions in a manner to permit the clip shank to be actuated generally axially to fastening position in said aperture and locked therein against withdrawal or reverse movement tending toward loosening or separation of the members of the assembly.

Another, more specific, object of the invention is to provide various forms of such fastening means in the manner of simple, one-piece, sheet metal clip devices which are cheap and inexpensive to provide and lend themselves to economical quantity production in that they may be produced at relatively low cost from ordinary sheet metal strip stock with litttle loss or waste of material.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a vertical sectional view of an installation in accordance with the invention embodying one form of the improved locking fastener shown in the initially applied position thereof and also in position for securing the installation; Fig. 2 is a side view looking from the direction indicated by the line 2—2 on Fig. 1; Fig. 3 is a perspective of the fastener per se employed in Figs. 1 and 2.

Referring now, more particularly, to the drawing, Figs. 1 and 2 show a fastening installation of general utility in which any two cooperating parts A, B, may be secured in generally normal relation to each other by a simple, inexpensive form of the fastener such as shown in Fig. 3, for example. The part A represents the support which is usually in the form of a panel, or the like, and is provided with an opening $a$ for receiving the shank or holding portion of the fastener as shown in Fig. 1. The part B designates the secured portion of any article or object to be fastened to the support A in generally normal relation thereto and locked against shifting, displacement or disassociation of said parts from assembled relation.

The fastener in this form of the invention, designated generally 10, Fig. 3, is a simply formed, inexpensive device which may be constructed of any suitable sheet metal material, preferably spring metal or cold rolled metal having spring-like characteristics. The device may be formed from blanks of various outlines, of course, but from a quantity production standpoint, is most advantageously provided from a comparatively small, generally rectangular blank which may be obtained from ordinary sheet metal strip stock with little loss or waste of material.

The metal strip is provided of a width to be received in the opening a in the support and is bent to define a shank or holding portion comprising a leg 11 and tongue 12 or similar yieldable element integrally united therewith at the leading end thereof. The extremity of the tongue 12 presents a locking shoulder which normally lies a distance from said leg member 11 greater than the size of said opening a in the support and includes one or more anchoring points or teeth 13 provided thereon in any suitable manner. The substantial mid-portion of the strip adjacent said shank leg 11 is formed into a return bend defining a U-shaped connecting portion comprising spaced, generally parallel and relatively yieldable arms 14, 15, the latter of which extends from said shank leg 11 in the same general direction as said tongue or yieldable locking element 12. Said upper arm 15 has the outer free end portion thereof bent to provide an attaching portion 17.

As shown in Fig. 1, the fastener thus provided is united to the part or object B through said attaching portion 17 by any suitable means such as rivets 18 or equivalent screws, welding, or the like attaching means. The fastener is accordingly so attached to part B, that in the assembled relation thereof on part A, the leading end of shank leg 11 is received in the opening a without the extremity of the yieldable tongue element 12 passing entirely through said opening. In this respect, the lower edge of part B firmly and rigidly rests upon the adjacent surface of the support. The shank leg 11 engages the opposite wall of said opening as the cooperating yieldable tongue element 12 is compressed toward said leg when received in said opening in the initial application of the fastener shank thereto, as shown in Fig. 1. In this initial juxtapositioning of the parts A and B, they are disposed in their predetermined properly assembled relation with the arm 11 and tongue 12 of the fastener in the opening, before the locking shoulder defined by the extremity of the tongue has cleared the opening. When it does clear the opening, consequent upon the shoving down of the lower arm of the U bend, the engaging end 13 of the tongue springs into position beneath the support, as shown at the right in Fig. 1 without changing the location of the arm 11 against the back of the opening.

The arm 15 of the U-shaped connecting portion of the fastener is more or less rigidly disposed with respect to part B by the attaching portion 17 while the cooperating relatively yieldable arm 14 carries the shank leg 11 in a manner whereby said shank may be easily and quickly actuated in a generally axial direction to project the tongue 12 thereof through the opening a in part B to substantially the position shown at the right in Fig. 1. This can be effected by any suitable tool applied to the yieldable arm 14 but preferably by a device embodying a substantial pin P which may be pushed against cooperating relatively yieldably arm 14 in such a manner that the shank leg carried thereby is easily and quickly actuated in a generally axial direction a distance sufficient for the extremity of tongue 12 to clear the opening. Said tongue 12 is thereupon free to spring outwardly to its normal untensioned relation wherein the extremity thereof extends beyond the edges of the opening and defines a shoulder adapted to positively engage the adjacent rearward face of the support A as shown in Fig. 1.

This locking fastener embodies an advantageous construction which is particularly suited for detachably securing a hollow container, or the like, to a supporting part without an unsightly or otherwise objectionable projecting relation of the fasteners externally of the container. In the present example, a condenser can B, of the type commonly used in radio apparatus, for instance, is shown positioned on the supporting panel A and provided with a plurality of spaced locking fasteners designed to be attached to the interior walls of the container with the shank legs 11 thereof extending outwardly of the container in position to be easily and quickly applied to correspondingly spaced openings a in said panel A.

The container is thus provided with fastening means in a manner whereby the same may be assembled on the supporting panel A with the shanks of the fasteners, as shown to the left in Fig. 1, being received in the openings a but without the extremities of the tongues 12 thereof passing through said openings. The container is thereby capable of being accurately and precisely positioned on the supporting panel prior to the operation by which the shanks of the fasteners are actuated to locked relation in the openings therein, as shown to the right in Fig. 1, upon application of the tool to the external abutment 14 of each fastener. In this relation, the locking action of the tongues 12, and the operation of the fasteners in general, is as described and inasmuch as the shank legs 11 are adapted to engage the respective outer walls of the openings a in opposing relation to each other, the container B or other similar object is fixedly and rigidly secured against any possible shifting or displacement from its proper assembled relation on the supporting panel, even under conditions of shock, vibratory motion, and the like.

I claim:

1. A locking fastener for securing an object or part to a supporting part through an opening in said supporting part, said fastener including a strip of metal having a bent portion providing a securing shank receivable in said opening in the supporting part, a resilient spring arm connected to said shank and extending at an angle thereto through a recess in said object to support said shank on one side of said object for substantially axial movement to final applied fastening position in said opening in the supporting part, and means connected to said spring arm for attaching the fastener at the opposite side of said object.

2. A locking fastener for securing an object or part to a supporting part through an opening in said supporting part, said fastener including a strip of resilient material having a bent portion providing a securing shank receivable in said opening in the supporting part, an arm connected to said shank and extending at an angle thereto through a recess in said object, a second arm connected to the arm first mentioned by a return bend and means to secure said second arm to the object to support said shank on one side of said object for substantially axial movement to final applied fastening position in said opening in the supporting part.

3. A locking fastener for securing a hollow object to a supporting part through an opening in said supporting part, said fastener including a strip of resilient material secured to said object and having a yieldingly supported shank extending through said opening and provided with a projecting arm adapted to engage the underside of the supporting part beyond the opening, said strip being secured to one face of the wall of the hollow object and projecting through an opening in the wall of the object to a position beyond the opposite face thereof.

4. A locking fastener for securing an object to a supporting part through an opening in said supporting part, said fastener including a strip of resilient material having a bent portion providing a securing shank receivable in said opening in the supporting part, an arm connected to said shank and extending at an angle thereto through a recess in said object, a shorter arm connected by a return bend to the arm first mentioned, and means connected to said shorter arm for attaching the fastener to said object.

5. A locking fastener for securing an object to a supporting part comprising a strip of resilient material having a shank adapted to extend through an opening and carrying an inclined free end portion adapted to engage the supporting part, said fastener having a return bend with one arm longer than the other, the longer arm being connected to said shank and the shorter arm having a lip by which it may be secured to the object, the longer arm of the fastener extending through a recess in the object.

GEORGE A. TINNERMAN.